Dec. 24, 1929.  H. J. BARTLEY  1,741,046
STORAGE BATTERY CONSTRUCTION
Filed June 4, 1926
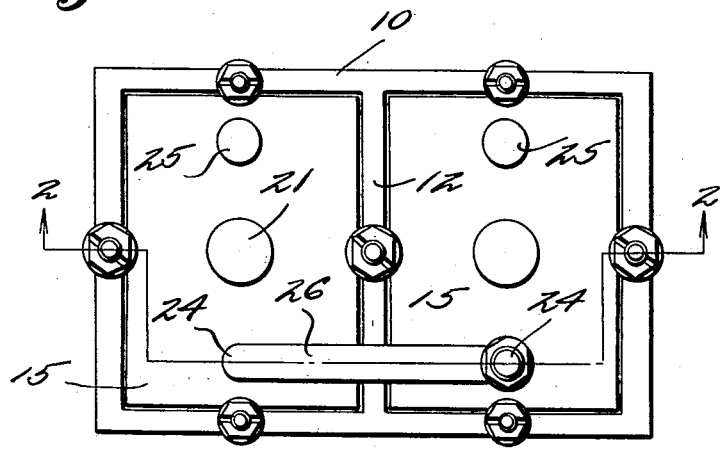
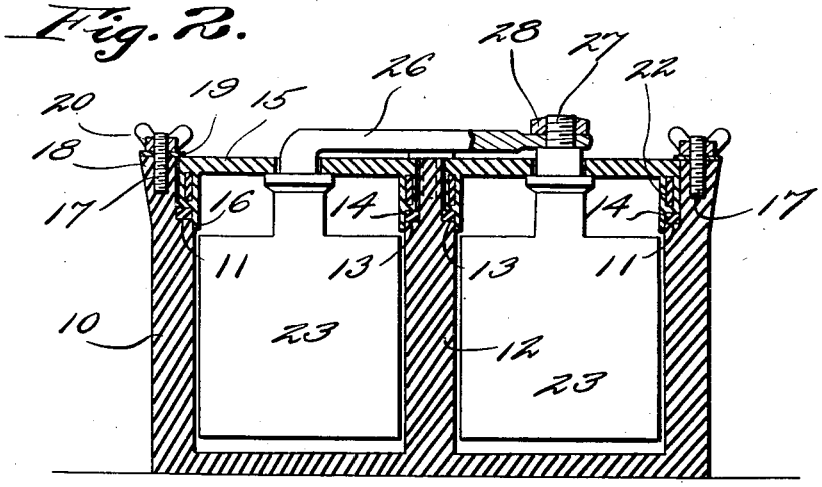
H. J. Bartley
INVENTOR
BY Victor J. Evans
ATTORNEY
WITNESS:

Patented Dec. 24, 1929

1,741,046

UNITED STATES PATENT OFFICE

HIRAM JAMES BARTLEY, OF ST. CATHARINES, ONTARIO, CANADA

STORAGE-BATTERY CONSTRUCTION

Application filed June 4, 1926. Serial No. 113,758.

This invention relates to storage batteries and has for its object the provision of a novel storage battery embodying many structural characteristics which will be of great benefit and a distinct improvement in the art inasmuch as the construction is such that the battery may be readily disassembled even by an unskilled person and without any particular apparatus, the disassembling being for the purpose of effecting cleaning out of the battery or the making of repairs and replacement thereto, the structure being different from the usual type inasmuch as the use of the sealing compound employed under ordinary circumstances is entirely eliminated, the parts being held together by detachable means which will permit ready access when removed.

An important and more specific object of the invention is to provide a storage battery in which the negative terminals of the cells are detachably connected instead of being sodded together as is the common practice, the cover structure being, furthermore, held in place by clamping means instead of being sealed in by plastic material applied in a molten state.

Another object is to provide a storage battery in which adequate sealing means is provided in connection with the cover for positively preventing the leakage of the electrolyte forming part of every storage battery.

The invention further contemplates various details of construction and arrangement which will be a step forward in the art, the entire device being, moreover, simple and inexpensive to manufacture, easy to assemble and disassemble, positive in action, efficient and durable in service, and a general improvement in the art.

With the above and other objects and advantages in view, the invention consists in the novel construction and arrangement of parts to be hereinafter more fully described and claimed, and illustrated in the accompanying drawings, in which:—

Figure 1 is a plan view of a storage battery constructed in accordance with my invention, and Figure 2 is a longitudinal sectional view taken therethrough on the line 2—2 of Figure 1.

Referring more particularly to the drawings, I have shown the battery as comprising a container or receptacle 10 constructed of any ordinary or preferred insulating and acid resisting material. Obviously, the casing may be of any size or shape, depending upon the capacity of the battery. At its inner walls, the casing is provided with a ledge 11 and it is furthermore provided with a vertically extending partition 12, the opposite sides of which are formed with ledges 13. Obviously, the longitudinal side walls are formed in a similar manner to provide seats for gaskets 14 of rubber or the like upon which fits the lower edges of a pair of covers 15 which are telescoped into the cells. The cover members are formed with depending flanges 16 which extend downwardly beyond the ledges 11 or 13, as the case may be, for the purpose of making liquid-tight joints so that there will be no possibility of any of the electrolyte leaking out at the top of the cover. Any suitable vent means may of course be provided for permitting escape of the gases which are given off by the battery during charge or discharge.

In order that the cover 15 may be held closed firmly at all times, use is made of a plurality of upstanding studs 17 which are anchored within enlarged portions 18 of the end walls and partition, these studs having disposed thereon washers 19 engaged by wing or thumb nuts 20, the purpose of the thumb nuts being to clamp the cover firmly down into compressing engagement with the gasket 14 for making the liquid-tight joint.

It is of course obvious that these clamping devices may be provided at any desired point and in the present instance one is disclosed as located at the center of the partition, one at the center of each end and two on each of the longitudinal side edges of the container, though it should be understood that there is no limitation as to the number at any point. The covers 15 are of course provided with the usual filling openings closed by removable plugs 21 as is customary in storage battery construction.

In order to avoid warping of the side edges of the covers, it is preferable that they have embedded therein metallic strips 22 which will of course constitute an efficient reinforcement and hold these flanged portions rigidly in place and prevent distortion thereof, even under the most trying circumstances.

Located within the respective cells are the usual plates, not shown in detail but indicated generally at 23, there being any desired number of plates in each group and the plates having the usual terminals 24 and 25. Obviously, one of the terminals 25 constitutes the positive and the other constitutes the negative, and it is equally clear that in case the cells are to be connected in series, as is customary, some means must be provided for bridging or connecting the terminals 24. In order to carry out this feature, one terminal member 24 is shown as provided with a bar 26 formed integrally therewith and overlying a portion of the next adjacent cover 15, the free end of this bar being apertured and adapted to be engaged upon a reduced threaded extension 27 on the other terminal post member 24, securing being effected by means of a suitable nut 28.

In the operation, it is of course apparent that the storage battery will act in exactly the same manner as any other but it possesses the great advantage of eliminating use of the usual sealing compound which is provided at the top of storage batteries and which must be steamed or otherwise heated to effect softening so that it may be removed whenever it is necessary to have access to the interior of the battery for making repairs or replacements in case of short circuiting. As a matter of fact, it is well known that the average life of a storage battery is about two years, possibly a little more, and it is equally clear that the life could be greatly prolonged if access could be had to the interior for the purpose of removing the sediment which accumulates from time to time. Under the present system it is necessary, when repairing a battery, to subject the same to heat in order that the sealing compound at the top thereof may be softened and removed, subsequently to which the entire battery must be disassembled, an operation during which it frequently occurs that the parts are so disarranged or damaged that replacement of the same parts is impossible, it being therefore requisite to employ a new set of plates or make other installation of entirely new material. With the present device it is quite clear that by removing the nuts 20 on the securing studs the cover members may be removed so that the plate either singly or in groups may also be removed so that sediment may be taken out, the battery flushed and a fresh electrolyte or acid solution introduced. Obviously, the cost of upkeep will be greatly increased and the length of life of the battery also increased so that it will be unnecessary to buy a new battery as often as was necessary under ordinary circumstances. It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:—

In a storage battery, a case formed to provide spaced compartments, a group of plates within each compartment, the alternate plate in each compartment having terminal lugs and a transverse bar connecting the same, a post rising from the connecting bar of the plate in one compartment and terminating in a reduced threaded extension, and an angular member connected with the transverse bar of the plates in the other compartment, and having an apertured end engaged upon said reduced extension, and a nut screwed upon said threaded extension for securing said angular member in place.

In testimony whereof I affix my signature.

HIRAM JAMES BARTLEY.